United States Patent [19]
Horlacher

[11] Patent Number: 5,915,524
[45] Date of Patent: Jun. 29, 1999

[54] CONVEYOR FOR A CONTAINER FILLING/ CAPPING MACHINE

[75] Inventor: Willy Horlacher, Vellberg, Germany

[73] Assignee: Benhil Gasti Verpackungsmaschinen GmbH, Neuss, Germany

[21] Appl. No.: 08/933,688

[22] Filed: Sep. 19, 1997

[30] Foreign Application Priority Data

Sep. 20, 1996 [DE] Germany .......................... 196 38 509
Nov. 5, 1996 [DE] Germany .......................... 196 45 454

[51] Int. Cl.[6] .......................... B65G 17/34; B65G 17/42
[52] U.S. Cl. .................................... 198/473.1; 198/867.15
[58] Field of Search ............................ 198/473.1, 867.15

[56] References Cited

U.S. PATENT DOCUMENTS

| | | |
|---|---|---|
| 2,954,113 | 9/1960 | Hibbard . |
| 3,040,873 | 6/1962 | Hobbs . |
| 3,805,947 | 4/1974 | Ward ................................. 198/867.15 |
| 5,127,514 | 7/1992 | Guttinger et al. ................... 198/473.1 |

FOREIGN PATENT DOCUMENTS

| | | |
|---|---|---|
| 0060720 | 9/1982 | European Pat. Off. . |
| 0498776 | 8/1992 | European Pat. Off. . |
| 647200 | 7/1928 | France . |
| 1508871 | 11/1967 | France . |
| 35 38 993 | 4/1987 | Germany . |
| 37 43 278 | 9/1988 | Germany . |
| 731361 | 6/1955 | United Kingdom . |

*Primary Examiner*—William E. Terrell
*Assistant Examiner*—Mark Deuble
*Attorney, Agent, or Firm*—Herbert Dubno; Andrew Wilford

[57] ABSTRACT

A conveyor for a container-handling machine has an endless transport element having a straight upper stretch and a row of equispaced laterally directed coupling formations, a row of substantially identical cell plates each having a coupling element fitting with respective ones of the coupling formations, and respective stationary guide elements extending along the transport element and holding the coupling elements in engagement with the respective coupling formations. The transport element includes a pair of parallel endless chains each provided with the coupling formations. The cell plates are each formed with a pair of coupling elements engageable with the formations of the respective chains.

16 Claims, 8 Drawing Sheets

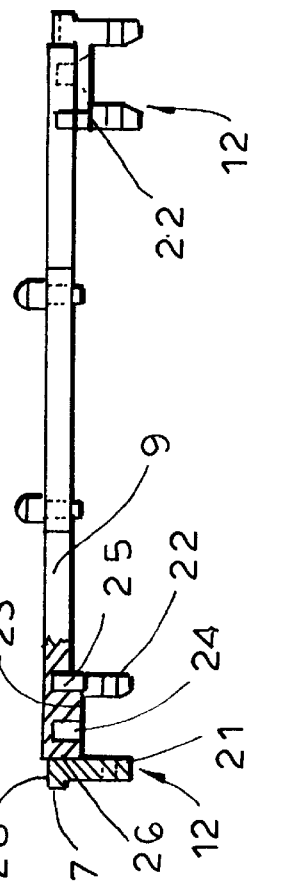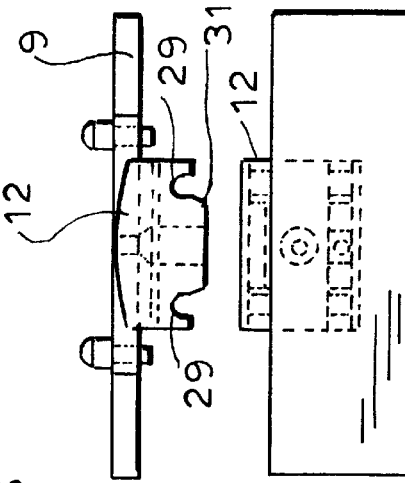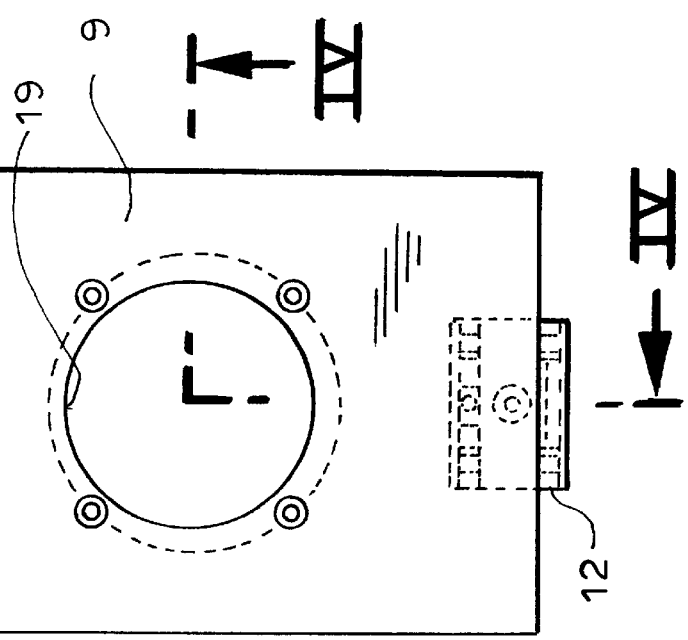

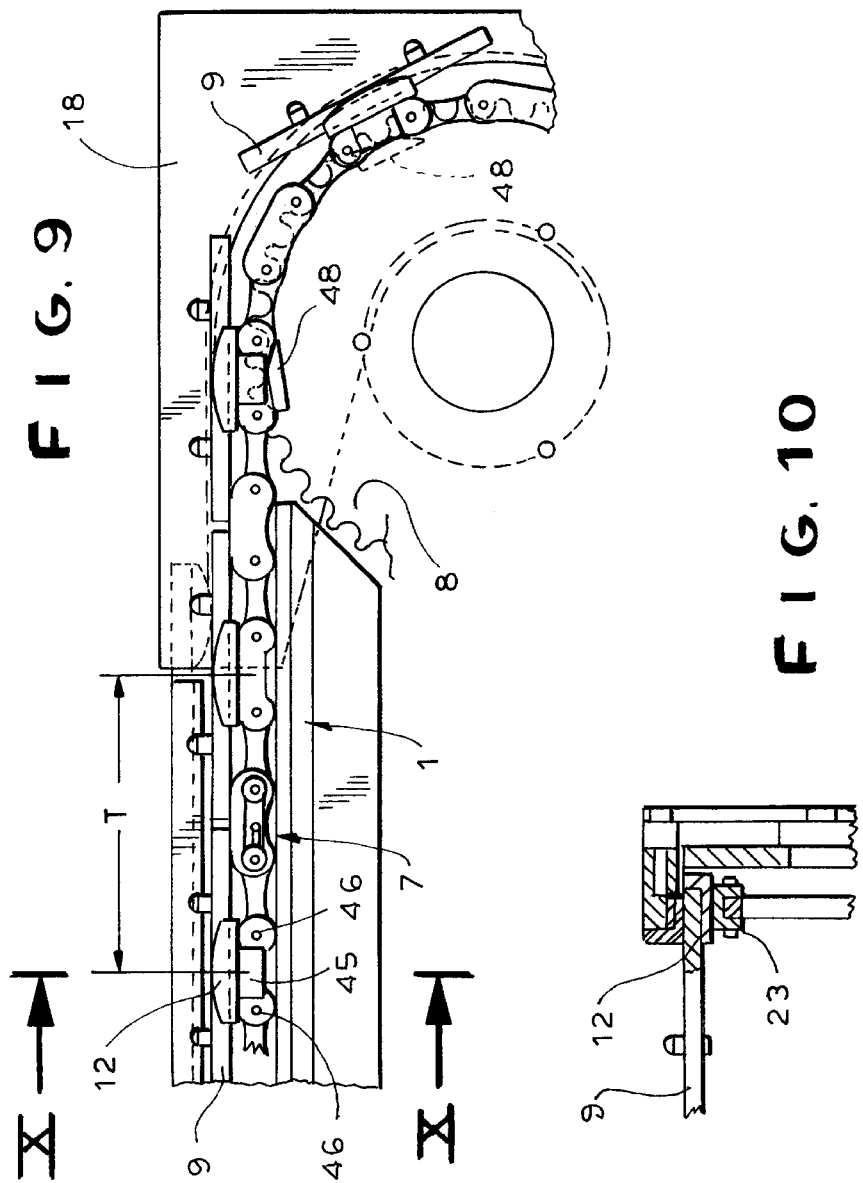

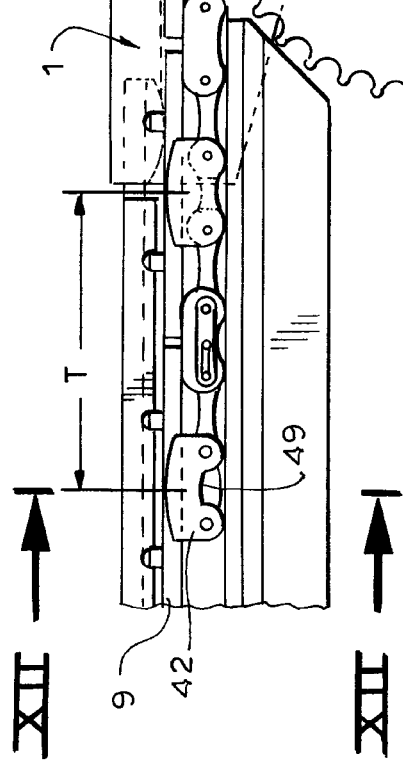
FIG. 11
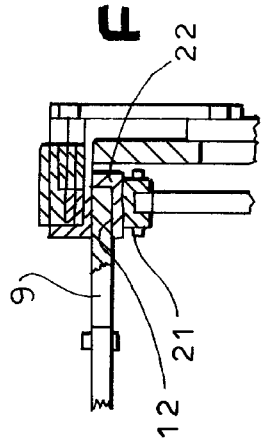
FIG. 12
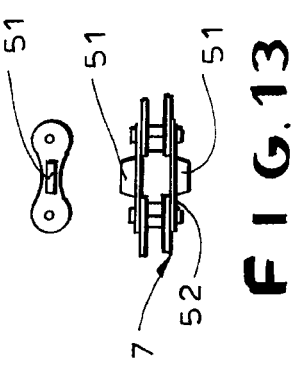
FIG. 13
FIG. 14

CONVEYOR FOR A CONTAINER FILLING/CAPPING MACHINE

FIELD OF THE INVENTION

The present invention relates to a conveyor. More particularly this invention concerns a conveyor used to convey a series of containers through a filling and/or capping machine.

BACKGROUND OF THE INVENTION

Containers are filled with fluent materials in a production line as they are moved along by a conveyor. The containers, e.g. bottles, are displaced from a supply to a filling station, then to a capping station and may pass through control checkpoints, labeling machines and the like. Such systems are used in the packaging of food, pharmaceuticals, beauty products, and numerous other consumer items.

A typical conveyor has at least one chain that carries a succession of so-called cell plates that each have a seat adapted to fit complementarily with one or more of the containers. Thus the containers are loaded onto the respective cell plates where they reside as the conveyor moves them through the various treatment stations until the finished package is picked off the conveyor, typically at the downstream end of an upper stretch. Then the empty plates travel back, normally upside down, on the lower stretch to the upstream end where more containers are loaded on and the cycle is repeated.

The main problem with this type of installation is that when the container size changes it is necessary to refit the conveyor with appropriately sized cell plates. This is typically a lengthy process entailing withdrawing holding screws at each plate, taking the plate off, putting the new plate in position, and securing the new plate in place with the screws. Obviously the down time for such an operation is considerable, but since the plates have to be very solidly linked to the conveyor so they do not shift thereon it is normally considered necessary to provide an attachment that cannot be undone easily. Furthermore the plates have to be exactly positioned and equispaced along the conveyor so that the containers they will hold are perfectly positioned in the various treatment stations.

In addition to the considerable down time for plate changing, this system has the disadvantage that the plates are often damaged by the tools used to make the changeover. Furthermore the protruding heads of the bolts are a trap for dirt that can foul the product being prepared.

German patent 3,538,993 uses a robot-type manipulator to withdraw the screws holding the cell plates in place and to lift off the freed cell plates by means of a suction grab and put then in storage. Another manipulator lifts a new plate off a supply and fits it in position while the screws are again set back in place by the robot. While this system does avoid the problem of dealing with slow manual labor, it still is relatively slow and has the above-mentioned problems with hygiene. In addition the equipment is very complex and expensive.

In German patent 3,743,278 a conveyor is provided where the attachment screws are replaced by individual latches on the cell plates. Normally vertical studs provided on the chain acting as conveyor element are gripped by the latches on the plates. While this system eliminates the problems with the prior-art screws, it entails a fairly complex construction of the individual cell plates that elevates the cost of the equipment considerably.

OBJECTS OF THE INVENTION

It is therefore an object of the present invention to provide an improved conveyor for a container-handling machine.

Another object is the provision of such an improved conveyor for a container-handling machine which overcomes the above-given disadvantages, that is which allows the cell plates to be changed in a very simple and easy manner, but where the cell plates are nonetheless solidly coupled to the conveyor element.

SUMMARY OF THE INVENTION

A conveyor for a container-handling machine according to the invention has an endless transport element having a straight upper stretch and a row of equispaced laterally directed coupling formations, a row of substantially identical cell plates each having a coupling element fitting with respective ones of the coupling formations, and respective stationary guide elements extending along the transport element and holding the coupling elements in engagement with the respective coupling formations.

This system therefore completely eliminates the need for mounting screws or in fact of any movable parts on or associated with the cell plates for allowing them to be mounted on or separated from the conveyor element. Instead the plates are fitted to the chain and are held by the guide elements thereon. The plates can be of simple construction so that they will have no hygiene problems and can be made relatively cheaply. The upper surface of the plate can be completely flat and featureless, except for the elements necessary to form the container-holding seat.

In accordance with the invention the transport element includes a pair of parallel endless chains each provided with the coupling formations. The cell plates are each formed with a pair of coupling elements engageable with the formations of the respective chains. Normally each chain has a multiplicity of crosswise link bolts having outer ends constituting the coupling formations although it is within the scope of this invention for the coupling formations to be tabs projecting from the plates and engaged between the respective link-bolt outer ends. Mounting the plates on two chains at two coupling formations ensures a fairly solid installation. According to the invention each coupling element is of U-section and engages over the respective chain and each U-section coupling element has a pair of side plates each formed with at least one outwardly open notch engaged over one of the respective link-bolt outer ends. Normally each side plate is formed with two such notches and has a central tab with outwardly tapering and beveled surfaces between the respective notches. Thus the coupling formations each engage two of the respective chain link pins for solidest possible longitudinal coupling.

The U-section coupling element has can be a pair of side plates each formed with at least one outwardly open notch and each coupling formation can be a laterally projecting tab complementarily engageable in the respective notch. Each coupling element is provided between its side plates with a cushion block engaging the respective chain.

Furthermore according to the invention each coupling element is mounted centrally on a respective side of the respective cell plate. The chain is provided with extra-wide support links each engaging two adjacent cell plates offset from the respective coupling elements. For completely rock-free mounting each chain has links provided with the coupling formations alternating with the extra-wide support links. Thus the ends of the plates rest on these wide links while the plates are coupled at their middles with the chains.

In accordance with the invention each coupling element has a horizontally projecting ridge engaging the respective guide elements. The guide elements have low-friction plastic strips directly engaging the coupling elements. More particularly the conveyor element has a lower straight stretch and the conveyor has downstream wheels over which the element is spanned. The guide elements including upper and lower support rails along each of the stretches and curved guides at the sprockets engaging the plates.

To change the plates according to the invention the coupling elements include outer hold-down rails engaging the ridges and provided with swing-out portions permitting cell plates to be separated from the chains. More particularly the chain has a straight lower stretch and the hold-down rails include an upper hold-down rail above the upper stretch and a lower hold-down rail below the lower stretch. Each hold-down rail can be provided with a respective one of the swing-out portions. The conveyor has an upstream end and a downstream end and the swing-out portions are both adjacent one of the conveyor ends. Furthermore a cell-changing wheel can be provided adjacent one of the swing-out portions for automatic changing of the plates.

BRIEF DESCRIPTION OF THE DRAWING

The above and other objects, features, and advantages will become more readily apparent from the following description, reference being made to the accompanying drawing in which:

FIG. 2 is a top view of a single cell plate of the conveyor of FIG. 1;

FIG. 3 is a side view taken in the direction of arrow III of FIG. 2;

FIG. 4 is an end view partly in section taken in the direction of arrow IV of FIG. 2;

FIG. 9 is a detail side view of another variant on the conveyor;

FIG. 10 is a cross section taken along line X—X of FIG. 9;

FIG. 11 is a view like FIG. 9 of another conveyor according to the invention;

FIG. 12 is a cross section taken along line XII—XII of FIG. 11; and

FIGS. 13 and 14 are top and side views of a single link of the chain of the conveyor of FIGS. 11 and 12.

SPECIFIC DESCRIPTION

Figure 1:
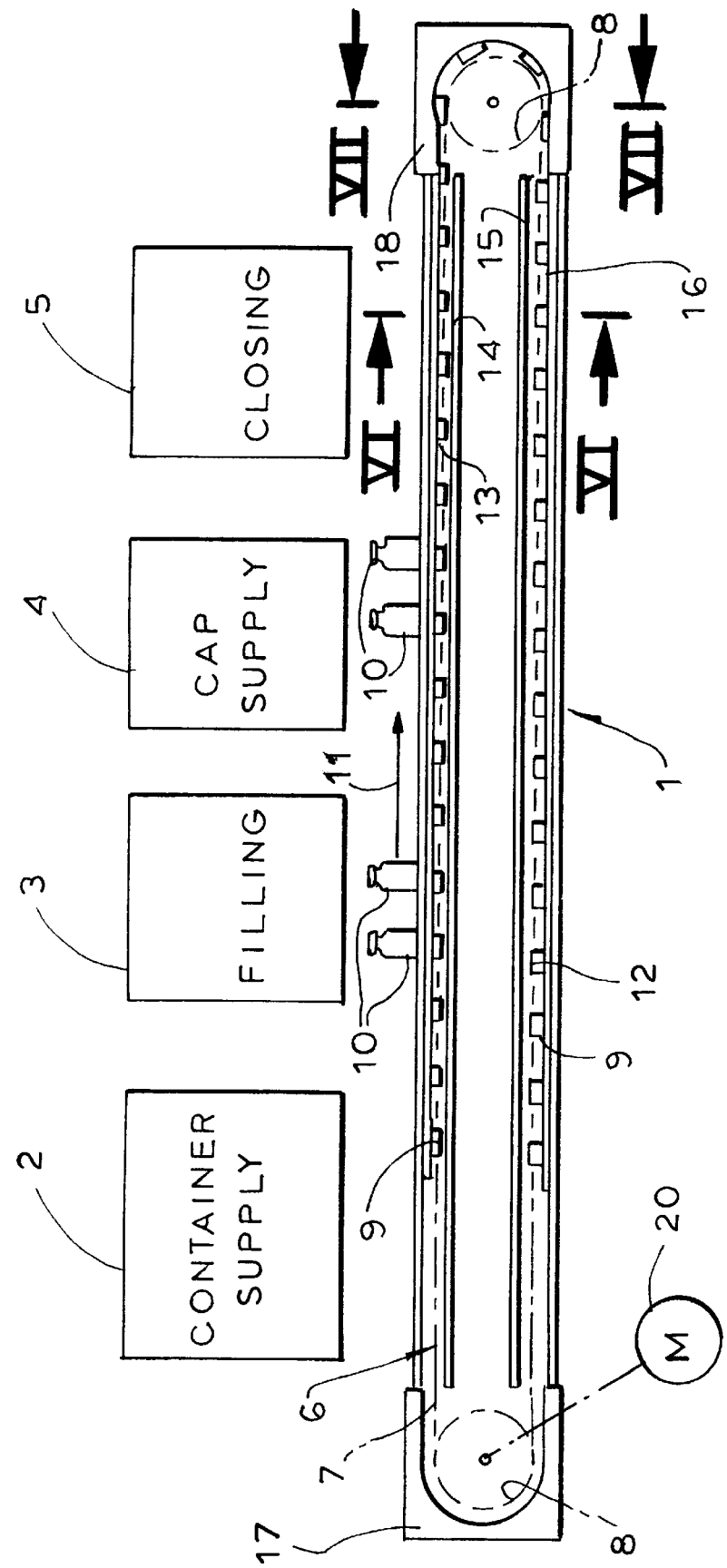
FIG. 1 is a small-scale and partly diagrammatic side view of the conveyor according to the invention.

As seen in FIG. 1 a conveyor 1 serves to displace containers 10, here bottles, from a container supply 2 through a filling station 3 to a cap supply 4 and through a closing or capping station 5. This conveyor 1 has an endless transport element 6 formed by a pair of identical roller chains 7 spanned at upstream and downstream ends over respective pairs of sprockets 8 driven by a motor illustrated schematically at 20 to move the upper stretch in a transport direction 11. A succession of so-called cell plates 9 according to the invention are mounted between the chains 7 and each form a seat 19 (FIG. 2) adapted to complementarily engage and hold a respective one of the containers 10 for movement in the direction 11 through the stations 2–5.

Each cell plate 9 has as best shown in FIGS. 2 through 4 a pair of coupling elements 12 that each sit on a respective one of the chains 7. The conveyor 1 has in its upper stretch (FIG. 1) upper and lower retaining rails 13 and 14 and in its lower stretch upper and lower further retaining rails 15 and 16 that keep the cell plates 9 in position on the element 6, that is with the U-section elements 12 engaged down over the upper stretch and up around the lower stretch. At the ends around the sprockets 8 the conveyor 1 has end guides 17 and 18 that prevent the plates 9 from falling off the chains 7 as they turn around these sprockets 8. The coupling elements 12 are each formed by a pair of side plates 21 and 22 adapted to engage the respective chain 7 and a top plate or cushion block 23 secured by a screw 24 to the plate 9 and sitting directly on the respective chain 7. A centering pin 25 is provided to maintain the downwardly open channels formed by the elements 12 parallel to each other. In addition each outer guide plate 21 is formed with a horizontally outwardly projecting ridge 26 having a vertical outer surface 27 and a surface 28 that is normally horizontal, facing up in the upper stretch and down in the lower stretch, and serving to ride on the guide rails 13 and 16 and well as on the end guides 17 and 18. Furthermore each plate 21 and 22 is formed with a pair of notches 29 adapted to fit over ends 32 of the pins 33 (FIG. 5) of the roller chains 7 and with a bevel 31 that allows the plates 21 and 22 to be dropped easily on the chains 7.

Figure 5:
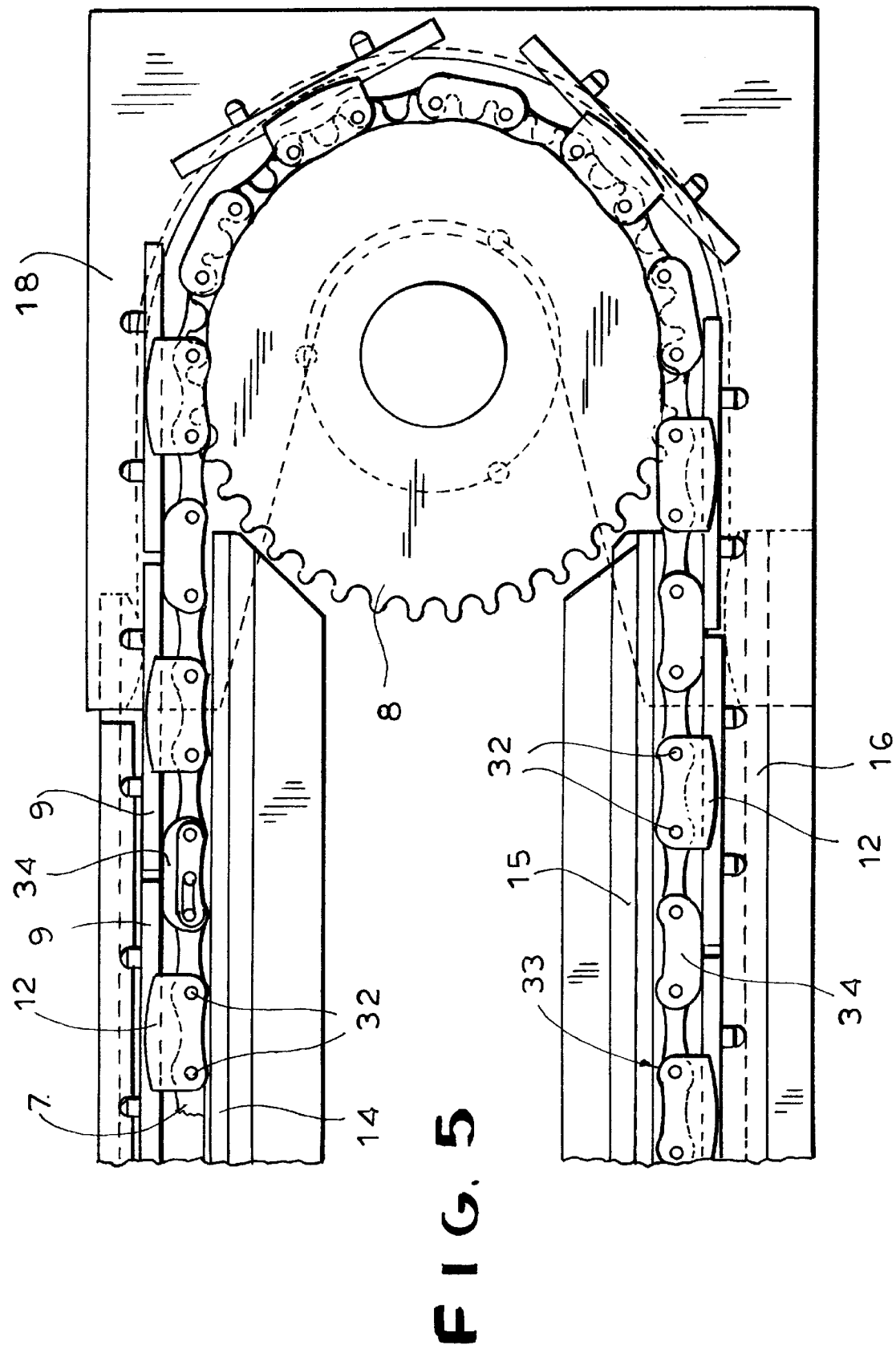
FIG. 5 is a side view of an end of the conveyor.
Figure 6:
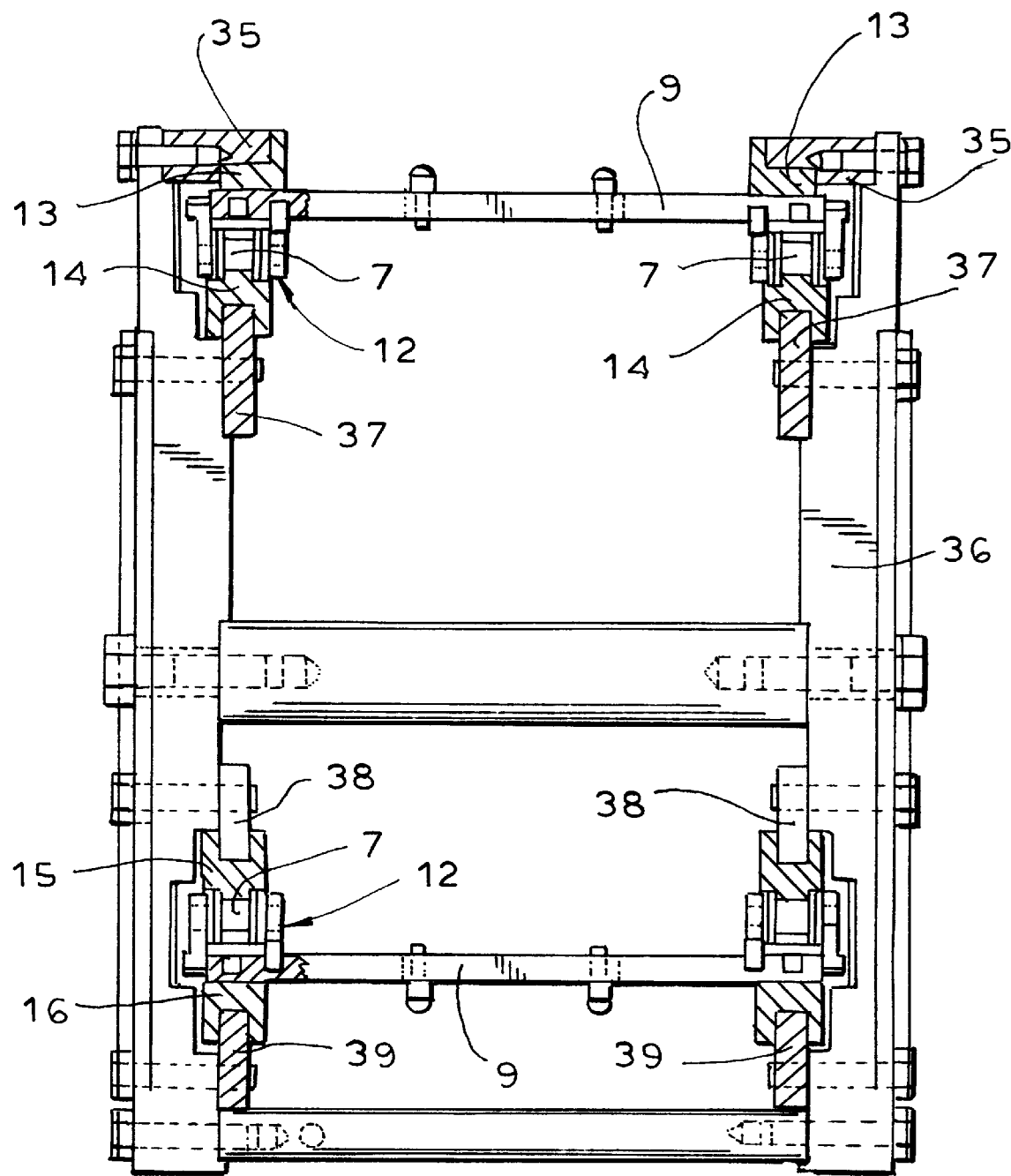
FIGS. 6 and 7 are cross sections taken along respective lines VI—VI and VII—VII of FIG. 1.
Figure 7:
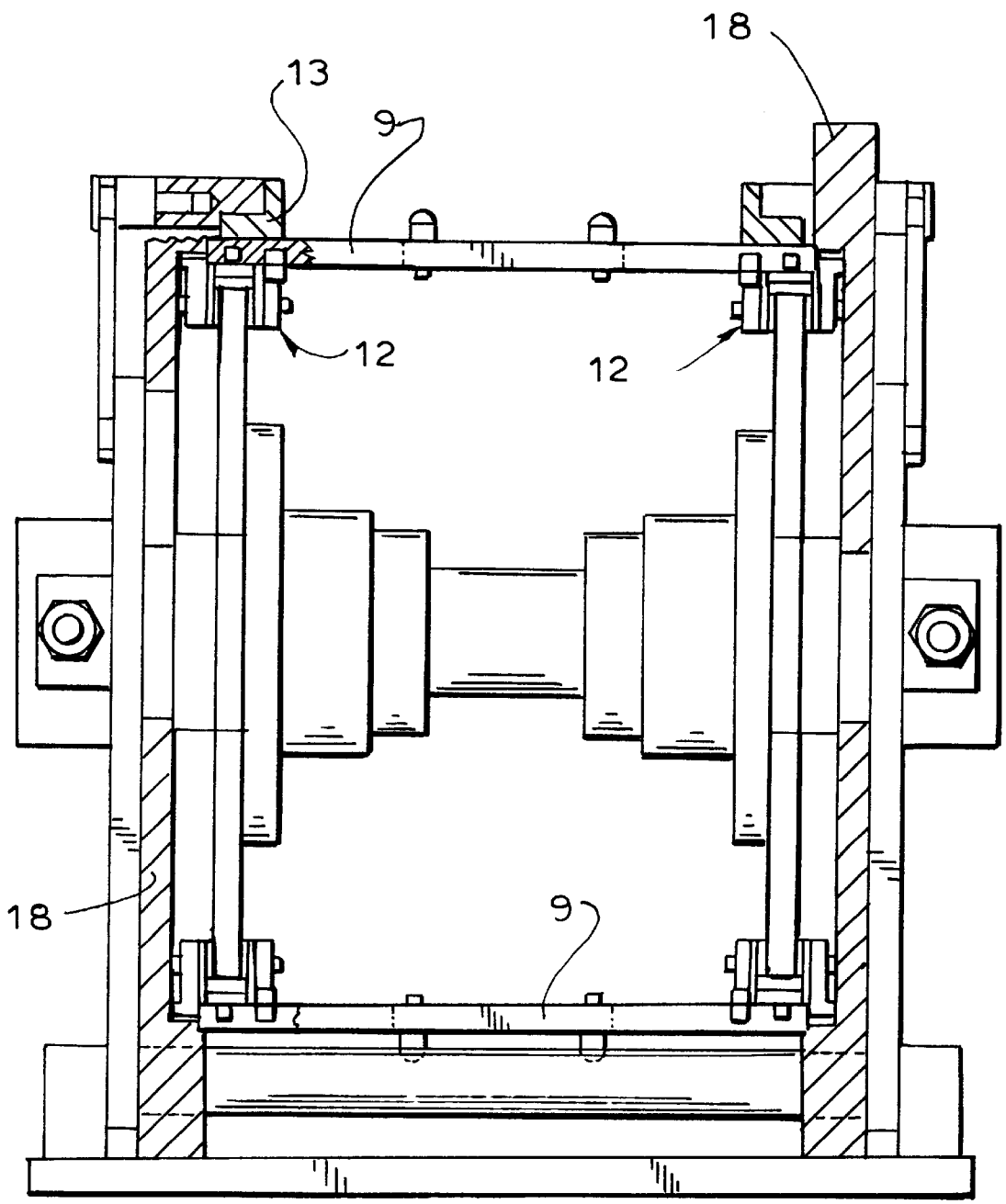

FIG. 5 further shows how each chain 7 is fitted with extra-wide links 34 at locations corresponding to the gap between succeeding plates 9 so that at these regions the plates 9 are supported directly on these links 34 and cannot tip. Furthermore as seen in FIG. 6 the upper rail 13, which is made of a low-friction material like polytetrafluorethylene or nylon, is secured by a mounting rail 35 to a frame 36 of the machine. The rails 12, 15 and 16 are similarly constructed of plastic and carried on respective mounting rails 37, 38, and 39 on the frame 38 of the machine. FIG. 7 shows how the end guide 18, which is substantially identical to the end guide 17, is formed as a large solid-plastic piece fixed to the machine frame 36.

Figure 8:
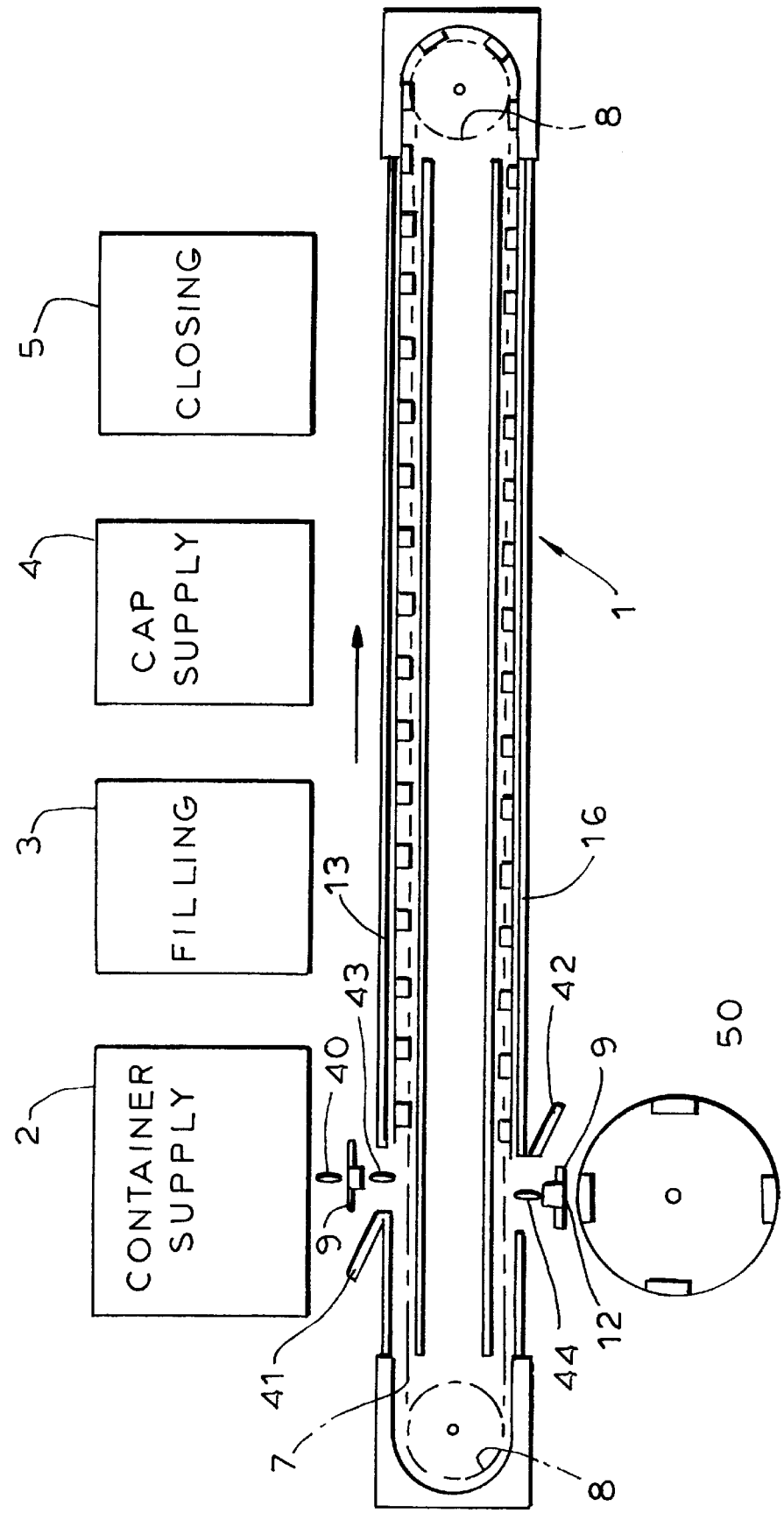
FIG. 8 is a view like FIG. 1 illustrating a variant on the conveyor.

In FIG. 8 the upper rail 13 is shown to have a portion 41 that can be swung up to allow the plates to be removed as shown by arrow 40 or installed as indicated by arrow 43. Alternately or in addition the lower rail 16 can have a similar hinged portion 42 that can be opened for removal of a plate 9 as shown by arrow 44. Thus when the workpiece 10 changes it is possible to remove and replace the plates 9 through the hole created by opening the portion 41, or remove them at 42 and replace them at 41. A wheel 50 is shown adjacent the swing-out portion 42 for receiving cell plates 9 removed there and another such wheel can be provided at the portion 41 to load new plates in at this location.

In FIGS. 9 and 10 the coupling elements each have, instead of a pair of downwardly open notches 29, a single down-wardly extending tab 45 that fits between rollers 46 mounted on the pins of the roller chain 7. The sprockets 8 have cutouts 48 that are spaced apart at a rectified distance equal to a longitudinal spacing T between adjacent plates 9 to accommodate these tabs 45 in the end turnaround regions.

Finally FIGS. 11 through 14 show a further arrangement where each coupling element 12 has a downwardly open notch 49 in which is received an outwardly projecting tab 51 of the side plates 52 of the respective link of the chain 7. These inter-engaging formations 49 and 51, like the formations 45 and 29, ensure that the plates 9 travel synchronously with the endless conveyor element 6.

I claim:

1. A conveyor for a container-handling machine, the conveyor comprising:

a pair of parallel endless transport chains each having a straight upper stretch and a row of equispaced laterally directed coupling formations;

a row of substantially identical cell plates each having a respective pair of U-shaped coupling elements engaging over the respective chains, engageable with the coupling formations of the respective chains, and each having a horizontally projecting ridge; and respective stationary guide elements extending along the transport chains, engaging the respective ridges, and holding the coupling elements in engagement with the respective coupling formations.

2. The conveyor defined in claim 1 wherein each chain has a multiplicity of crosswise link bolts having outer ends constituting the coupling formations.

3. The conveyor defined in claim 2 wherein the coupling elements are tabs projecting from the plates and engaged between the respective link-bolt outer ends.

4. The conveyor defined in claim 2 wherein each U-section coupling element has a pair of side plates each formed with at least one outwardly open notch engaged over one of the respective link-bolt outer ends.

5. The conveyor defined in claim 4 wherein each side plate is formed with two such notches and has a central tab with outwardly tapering and beveled surfaces between the respective notches.

6. The conveyor defined in claim 1 wherein each U-section coupling element has a pair of side plates each formed with at least one outwardly open notch and each coupling formation is a laterally projecting tab complementarily engageable in the respective notch.

7. The conveyor defined in claim 1 wherein each coupling element has a pair of side plates, and each coupling element is provided between its side plates with a cushion block engaging the respective chain.

8. The conveyor defined in claim 7 wherein each coupling element is mounted centrally on a respective side plate of the respective cell plate.

9. The conveyor defined in claim 8 wherein each chain is provided with a plurality of wide support links each engaging two adjacent cell plates offset from the respective coupling elements and with shorter links between the wide links.

10. The conveyor defined in claim 9 wherein the short links are provided with the coupling formations and alternate with the wide support links.

11. The conveyor defined in claim 1 wherein the guide elements have low-friction plastic strips directly engaging the ridges.

12. The conveyor defined in claim 1 wherein the coupling elements include outer hold-down rails engaging the ridges and provided with swing-out portions permitting cell plates to be separated from the chains.

13. The conveyor defined in claim 12 wherein the chains each have a straight lower stretch and the holddown rails include an upper hold-down rail above each upper stretch and a lower hold-down rail below each lower stretch, each hold-down rail being provided with a respective one of the swing-out portions.

14. The conveyor defined in claim 13 wherein the conveyor has an upstream end and a downstream end and the swing-out portions are both adjacent one of the conveyor ends.

15. The conveyor defined in claim 14, further comprising means including a cell-changing wheel adjacent one of the swing-out portions.

16. The conveyor defined in claim 1 wherein the conveyor has downstream wheels over which the chains are spanned, the guide elements including upper and lower support rails along each of the stretches and curved guides at the sprockets engaging the plates.

* * * * *